US008477906B2

(12) United States Patent
Morse et al.

(10) Patent No.: US 8,477,906 B2
(45) Date of Patent: Jul. 2, 2013

(54) HIGH DEFINITION SCINTILLATION DETECTOR FOR MEDICINE, HOMELAND SECURITY AND NON-DESTRUCTIVE EVALUATION

(75) Inventors: Theodore F. Morse, Little Compton, RI (US); Rajiv Gupta, Wayland, MA (US); Carson B. Roberts, Waltham, MA (US); Robert D. Chivas, Boston, MA (US)

(73) Assignees: Trustees of Boston University, Boston, MA (US); Corporate Sponsored Research and Licensing for Massachusetts General Hospital, Partners Healthcare System, Inc., Boston, MA (US)

( * ) Notice: Subject to any disclaimer, the term of this patent is extended or adjusted under 35 U.S.C. 154(b) by 623 days.

(21) Appl. No.: 12/529,867

(22) PCT Filed: Mar. 5, 2008

(86) PCT No.: PCT/US2008/002932
§ 371 (c)(1),
(2), (4) Date: Jun. 10, 2010

(87) PCT Pub. No.: WO2009/008911
PCT Pub. Date: Jan. 15, 2009

(65) Prior Publication Data
US 2010/0272234 A1 Oct. 28, 2010

Related U.S. Application Data
(60) Provisional application No. 60/904,973, filed on Mar. 5, 2007.

(51) Int. Cl.
*G01T 1/203* (2006.01)
*H05G 1/64* (2006.01)

(52) U.S. Cl.
USPC ........... 378/98.8; 250/370.09; 250/370.11

(58) Field of Classification Search
USPC .............. 378/98.8, 98.9; 250/370.09, 370.11
See application file for complete search history.

(56) References Cited

U.S. PATENT DOCUMENTS

| | | | | |
|---|---|---|---|---|
| 5,554,850 | A | * | 9/1996 | Hejazi ........................ 250/367 |
| 6,384,400 | B1 | * | 5/2002 | Albagli et al. .......... 250/214 VT |
| 6,455,860 | B1 | * | 9/2002 | Mooney ........................ 250/397 |
| 6,487,351 | B1 | * | 11/2002 | Cryan et al. ................ 385/120 |
| 8,063,379 | B2 | * | 11/2011 | Suhami ................... 250/370.09 |
| 2004/0116807 | A1 | * | 6/2004 | Amrami et al. .............. 600/436 |
| 2004/0218712 | A1 | | 11/2004 | Jiang et al. |
| 2004/0238749 | A1 | * | 12/2004 | Fontbonne et al. .......... 250/368 |
| 2005/0274895 | A1 | | 12/2005 | Jiang et al. |
| 2006/0054863 | A1 | | 3/2006 | Dai et al. |
| 2010/0272234 | A1 | * | 10/2010 | Morse et al. .................. 378/62 |

FOREIGN PATENT DOCUMENTS

| | | |
|---|---|---|
| EP | 1 103 826 | 11/2000 |
| JP | 60-159675 | 8/1985 |

* cited by examiner

*Primary Examiner* — Thomas R Artman
(74) *Attorney, Agent, or Firm* — Preti Flaherty Beliveau & Pachios LLP

(57) ABSTRACT

A bundle of drawn fibers that have X-ray scintillating unagglommerated nanocrystallite particles in plastic or glass cores of down to 0.1 micron spacing and claddings of X-ray absorbing compounds in the cladding composition. Optional is a cover to the bundle that blocks light from leaving the bundle at the X-ray side while allowing X-rays to pass into the cores. To image the light exiting the fiber bundle at the sub-micron level, light expansion is preferable using either a lens system or a fiber bundle expander.

17 Claims, 9 Drawing Sheets

HIGH DEFINITION SCINTILLATION DETECTOR FOR MEDICINE, HOMELAND SECURITY AND NON-DESTRUCTIVE EVALUATION

CROSS REFERENCE TO RELATED APPLICATIONS

This application claims priority to U.S. Provisional Application No. 60/904,973 filed Mar. 5, 2007.

STATEMENT REGARDING FEDERALLY SPONSORED RESEARCH OR DEVELOPMENT

This invention was made with Government Support under Contract No. FA9550-05-1-0107 awarded by Air Force Office of Scientific Research. The Government has certain rights in the invention.

FIELD, BACKGROUND, AND MOTIVATION FOR THE INVENTION

The present invention relates to X-ray imaging of very small formations within human as well as inanimate subjects and is aimed at improving the spatial resolution and the detective quantum efficiency (DQE) of X-ray detectors.

Currently, the highest resolution of digital X-ray imaging systems is up to 25 microns. At this spatial resolution, many pathologies (e.g., micro calcifications in breast cancer) are too small to be visualized at an early stage. In mammography, the resolution of present digital machines is of the order of 50 to 100 μm.

Coronary heart disease is the leading cause of death in the United States today. The field of cardiology is changing its focus towards detection of vulnerable plaque i.e. plaque that is prone to rupture. A large number of patients (especially diabetics) suffer from endothelial dysfunction that occurs at the micro-vascular level. Histological studies show that endothelial dysfunction leads to vulnerable plaque formation that has a high lipid component and a thin fibrous cap of the order of 60 μm. Currently, the composition of a coronary plaque cannot be determined non-invasively and differentiation between vulnerable and stable plaque is not possible due to limited spatial resolution. The early detection of endothelial dysfunction (e.g., via direct visualization of the architecture of the coronary plaque) by imaging at the 1 μm level would allow early treatment of these individuals thus potentially reducing morbidity and mortality in this high-risk cohort.

The presence of calcified coronary artery plaque is the most frequent reason for false positive evaluations, often leading to unnecessary additional testing hence limiting the clinical utility of cardiac CT. It has been shown that dense calcium, due to the limited spatial resolution, creates a "spillover" effect into adjacent, lower-intensity voxels. The resulting "calcium blooming" obscures the coronary artery lumen and leads to an over-estimation of luminal stenosis. Improving resolution from 0.75 mm in 16 slice scanners to 0.6 mm (600 microns) has partially alleviated this problem. Further improvement to the 1 micron level or lower would be a giant leap for this technology.

A recent paper in the Proceedings of the National Academy of Sciences demonstrated the presence of micro-calcifications (~10 μm) in the thin fibrous cap of coronary artery plaque. This paper also showed that these micro-calcifications, when present in an area of high circumferential stress (>300 kPa), can magnify the stress to nearly twice this value when the fibrous cap is <65 μm thus leading to plaque rupture. Development of a high resolution digital X-ray detector array can improve detection of such calcification and lead to non-invasive identification of vulnerable plaque.

In demanding applications such as space and aviation, non-destructive testing of engine parts and materials suffer from the same lack of higher spatial resolution and DQE. For example, 3-D X-ray analysis of microscopic flaws in welds is of obvious importance to space technology, and the Jet Propulsion Laboratory at the National Aeronautics and Space Administration is interested in non-destructive evaluation using X-ray imaging.

In Computer-Assisted Tomography (CT), the highest resolution of current technology is 60-80 μm for Xtreme CT and micro CT. As such "small animal imaging", which currently means mice, is not of great use when imaging even smaller organisms such as fleas and fire-flies.

The above list captures just some of the advantages that would result from this improvement in X-ray resolution. One micron or lower resolution would permit the entire field of radiology to move closer to histo-radiology. This will have an immense impact on the ability of radiologists to diagnose disease with maximum sensitivity and specificity. Such a capability would do for medical imaging what the transistor did for electronics. Success of this project would, indeed, be a "game changer".

Limitations in spatial resolution are accompanied by a similar lack of the Detective Quantum Efficiency (DQE). DQE is defined as the ability of the imaging system in transforming the absorbed quanta into the final image without introducing additional noise.

BRIEF SUMMARY OF THE INVENTION

The present invention improves the spatial resolution of digital imaging to 1 micron or sub-micron level, while keeping the X-ray dose acceptable. It provides a new technology based on scintillation light confined to individual nano-fibers in a bundle that concomitantly improves the spatial resolution and DQE.

The invention provides a bundle of drawn fibers that contain X-ray scintillating nanocrystallite particles in light guiding plastic or glass cores. In an embodiment, unagglommerated nanocrystallite particles are used as the source of scintillation. Each core can be as small as 100 s of nanometers in diameter and there can be many millions of cores in a bundle, giving extremely close core spacing. Each fiber or nano-core has a cladding of X-ray absorbing compounds that absorb X-rays but the cores reflect the light from the scintillating nanocrystallites light via total internal reflection (TIR) due to the difference of indices of refraction. Optionally, one can cover one end of the nano-core bundle with a thin mirror so that it reflects the generated light in each core, blocking it from leaving the bundle, while allowing X-rays to pass into the cores.

To image the light exiting the fiber bundle at the micron or sub-micron level, optical expansion is possible using either a lens system or a fiber bundle expander.

The X-ray imaging system using such an invention overcomes the deficiencies of the current systems as it improves light generation, and has higher light capture efficiency. It intrinsically rejects scatter, eliminates cross-talk between the guiding cores, and is self-collimating.

DESCRIPTION OF THE DRAWING

The invention is described below in the Detailed Description in conjunction with the drawing of which.

DETAILED DESCRIPTION OF THE INVENTION

Figure 1:
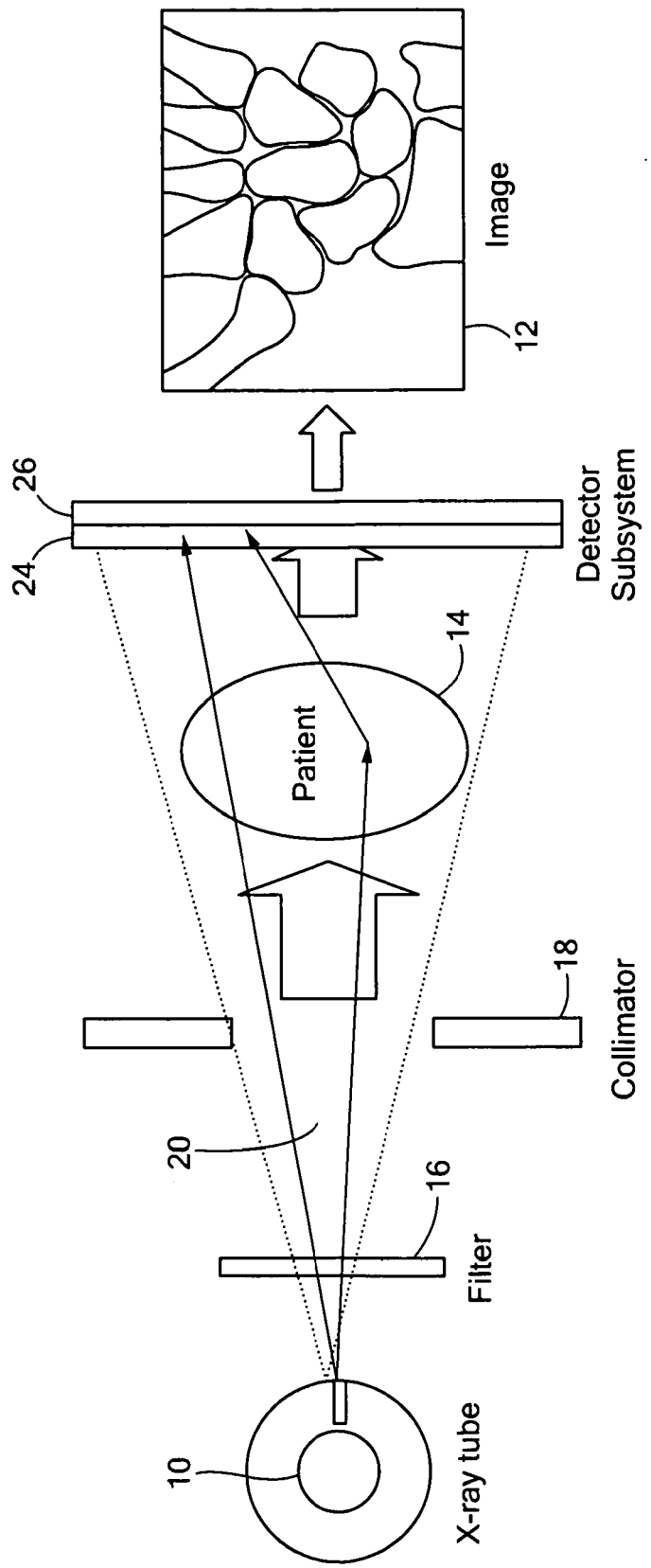
FIG. 1 is a diagram of an X-ray analysis setup as practiced in the art.

FIG. 1 shows the imaging chain of a typical imaging system from X-ray generation at source 10 to the final image produced by image processing electronics 12. The X-ray photons that are too low in energy to make it across a patient or other subject of study 14 are filtered out by a filter 16. The X-ray beam, after filtration, is collimated in a collimator 18 to limit the rays to passes through the patient or subject 14. The photon flux along the principle ray is attenuated in a density-dependent manner, thus imprinting the anatomical information in the subject 14 in the X-ray beam 20. A large fraction of the X-ray beam 20 traveling through the patent 14 is scattered and contributes significantly to X-ray dose and image noise.

Figure 2:
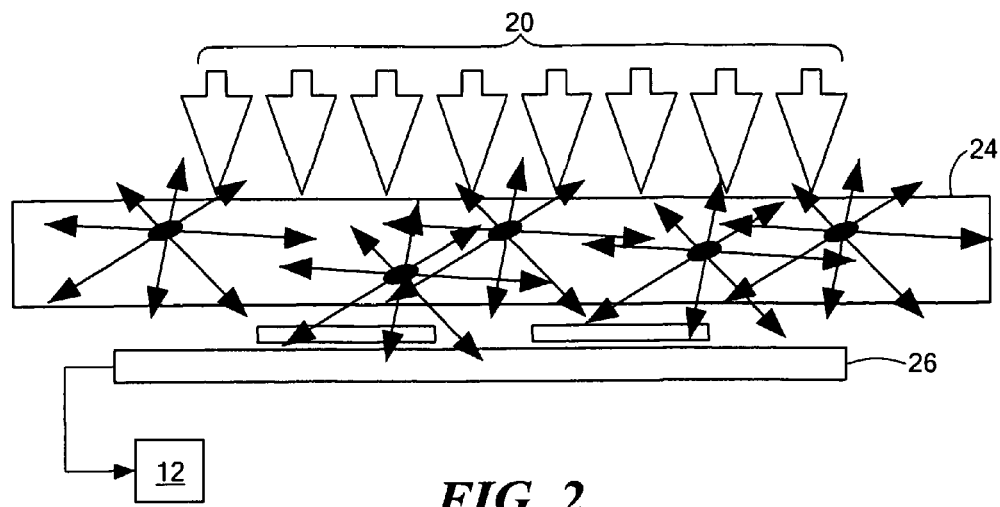
FIG. 2 is a section view of prior art scintillation and detection layers.

In the prior art, and as shown in FIG. 2, a digital detector subsystem 22 comprises a scintillation layer 24 typically grown on a semiconductor sensor layer 26 which converts X-ray energy directly into a digital image. A digital detector consists of a film of scintillator crystals 24 grown directly on a matrix of photo detectors 26 fabricated on an amorphous silicon wafer. The scintillator material converts incident X-ray energy to light. The generated light is sensed by a photosensitive diode, which generates and stores signal charge. Dedicated electronic circuitry then creates signal that is proportional to the charge (and in turn, to the intensity of the incident X-ray photons) and transfers it to external circuitry for further processing. In some designs, the scintillator is deposited directly on the amorphous silicon photosensitive elements in order to provide an intimate optical contact. In other cases such as in FIG. 3 the scintillator layer 24 has a fiber bundle 25 that directs light to a photo-detector 26.

There are various factors that limit the sensitivity and spatial resolution of X-ray images acquired using the above design.

The scattering of the X-ray photons in the patient, and the visible photons they generate in the scintillator, are a significant source of noise and reduced resolution. The scatter radiation in the patient, which generates off-axis radiation and creates a characteristic haze in the image, is typically rejected by an anti-scatter grid in front of the detector. Such grids, however, cannot account for visible photon scattering which is caused by the finite thickness of the scintillating material in the layer 24. This is schematically illustrated in FIG. 2. The arrows 20 correspond to the X-rays that have passed through the target and the anti-scatter grid, and the arrows in the layers 24 are the scintillating photons produced by the crystal that impinge on a suitable photodetector 26. A scintillation event at one location can be detected by a photo-detector that is far away from it causing a condition of crosstalk. Only a scintillator of zero thickness would have no crosstalk but it would have no sensitivity as well.

Figure 3:
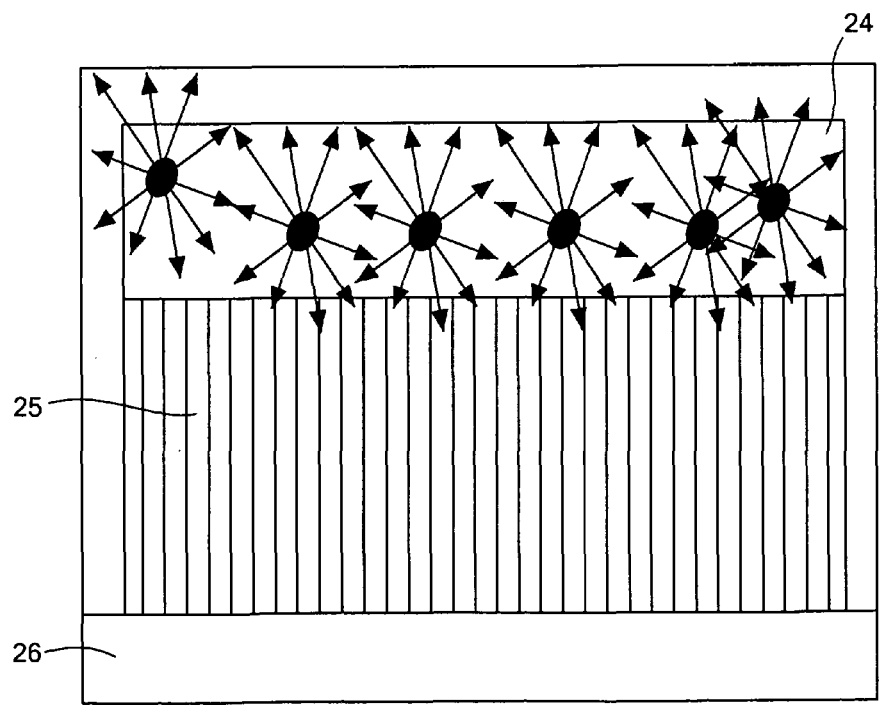
FIG. 3 is an alternative view of scintillation and detection schemes of the prior art.

One way in which this situation can be improved is through the use of the collimating plate. This is a coherent bundle of light guides that, once the radiation is converted into light and the light is captured by the light guide, confines the light within each of the separate cores of the bundle 25. This is schematically illustrated in FIG. 3. The addition of a collimating coherent bundle below the source of scintillation, while helping to reduce the crosstalk, is incapable of increasing resolution to 1 μm or better. This is due to the fact that the thickness of the scintillating material placed on top of the plate is much larger than the separation of the guiding cores of the coherent bundle itself.

Figure 5:
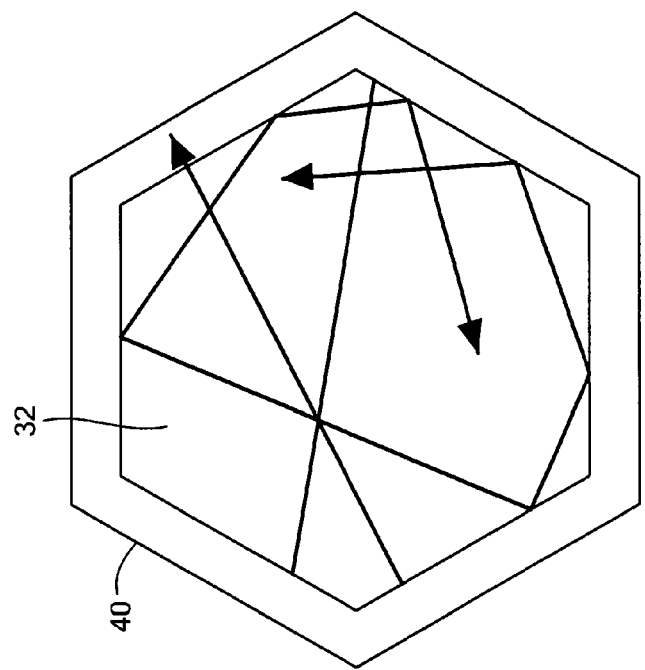
FIG. 5 is an orthogonal sectional view of a fiber according to the invention.
Figure 4:
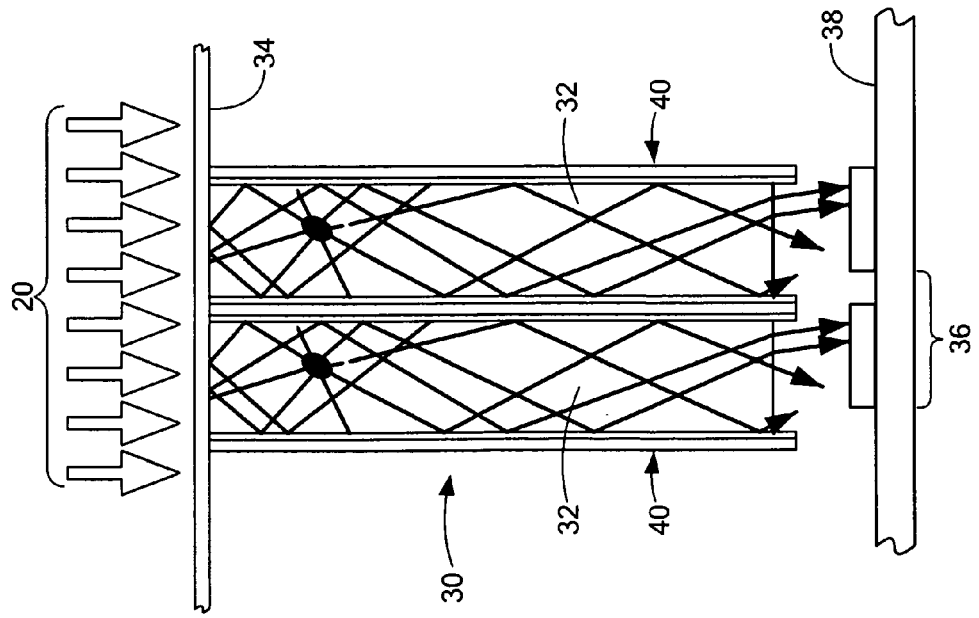
FIG. 4 is a section view of a portion of a bundle according to the invention.
Figure 6:
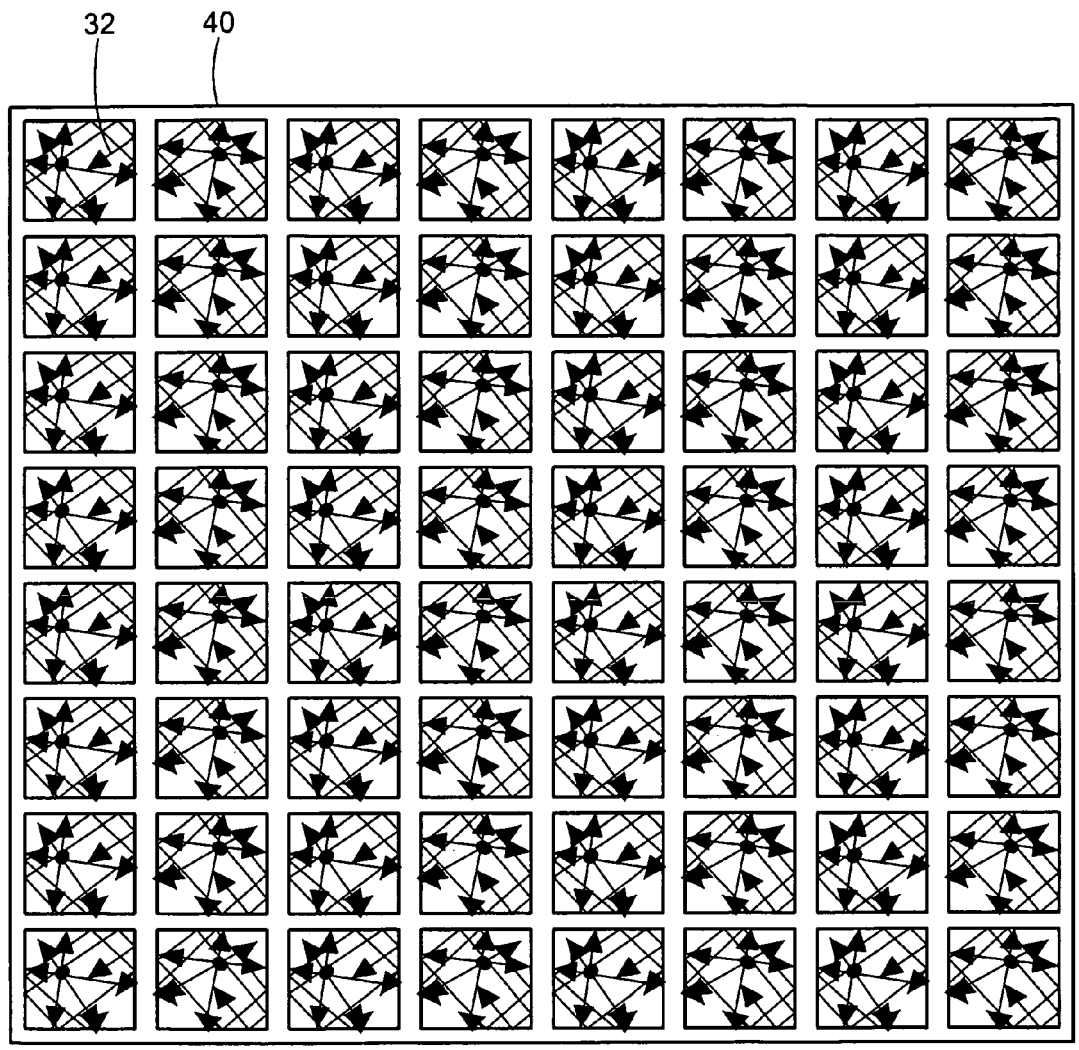
FIG. 6 is a sectional view of a stack of fibers forming a partial bundle according to the invention.
Figure 7:
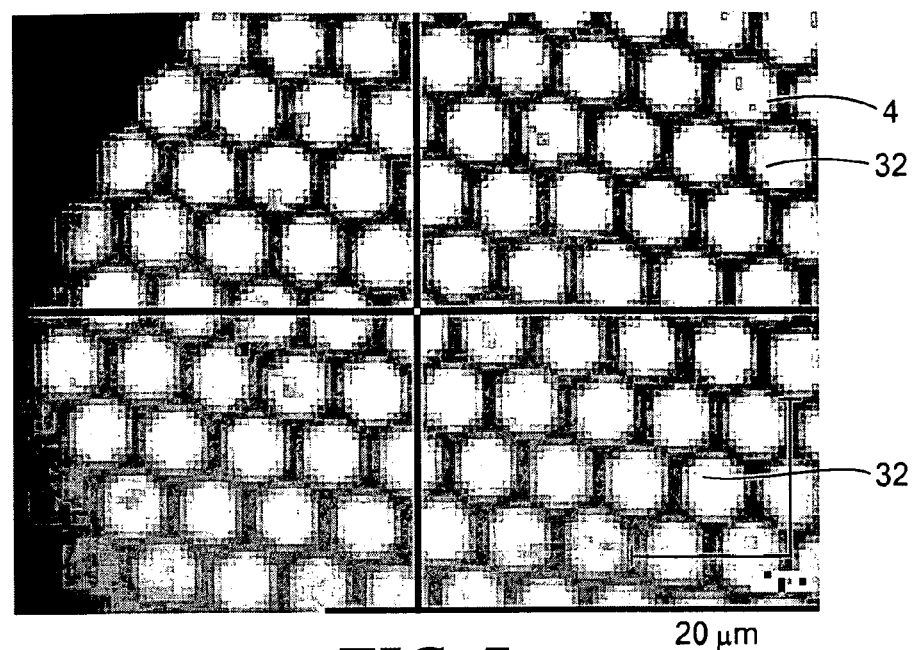
FIG. 7 is a photomicrograph of a fiber bundle or precursor therefore according to the invention.
Figure 8:
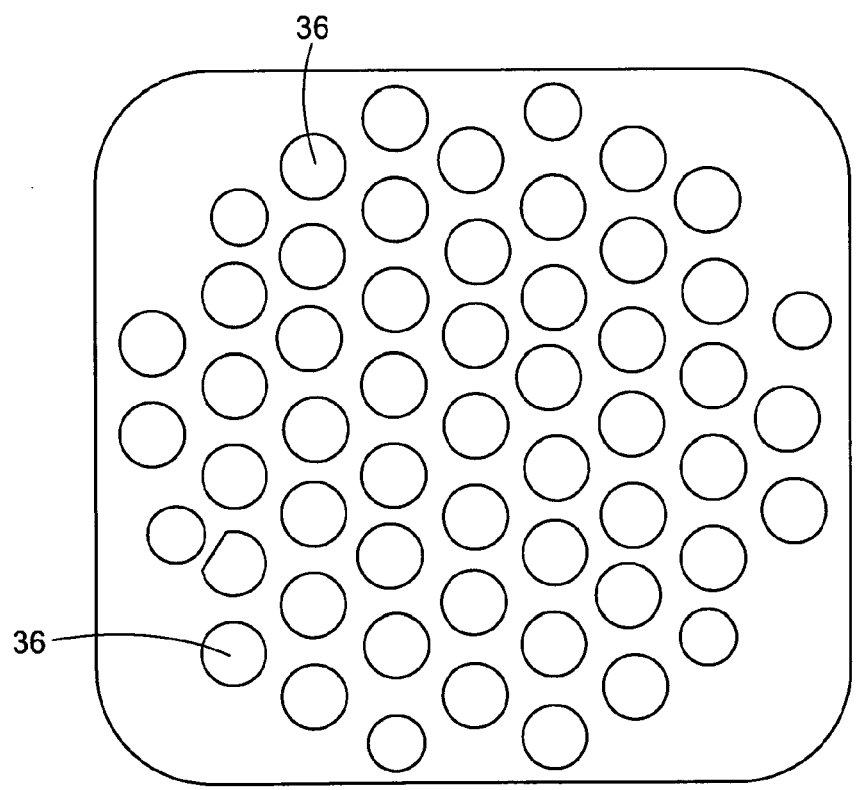
FIG. 8 is a diagrammatic view of a fiber bundle useful in understanding the invention.

In FIG. 4 two adjacent fibers, out of a bundle 30 of many fibers, are shown with scintillating material in each of the cores 32. The X-rays having passed through an object, now interact with material in the cores 32 such that visible photons result. These visible photons are confined to the individual cores, so that there is no "cross-talk" and exit at the bottom toward a photo detector 38. Since the visible photons are distributed over 4π steradians, a thin film 34 transparent to X-rays but reflecting to the visible light can be placed on top of the array of guiding cores 32 to increase intensity by eliminating loss of light out the top of the bundle. The resolution remains on the order of the core separation 36. FIG. 5 shows a magnified view of a single fiber. FIG. 6 shows a more complete bundle. Actual bundles may contain many millions of individual fibers drawn in multiple steps as described below. Shapes of square, hexagonal or round fibers are all possible. FIGS. 7 and 8 respectively illustrate, micro photographically and schematically, the nature of portions of bundles according to the invention.

The X-ray beam incident on the detector 38 consists of both the primary beam (i.e., the X-ray photons traveling directly from the focal spot of the X-ray tube to the detector element), and the scattered radiation from wandering X-rays produced by the interaction of the primary beam with the subject. In typical X-ray imaging applications, the latter—which can make up more than 50% of the incident photons—contributes significantly to the image noise.

Without correction, the scatter intensities may severely impair image quality. To reduce the impact of scatter, multiple methods are employed either to reduce the scatter directly, or to "subtract" its effect in the final images through algorithmic means. A commonly employed method is to block the scattered radiation before it reaches the detector (e.g. by an anti-scatter grid in front of the detector. Such arrangements are inherently wasteful of available energy. While they preferentially block out the off-angle scatter radiation, they necessarily block out a fraction of the primary radiation as well.

In an embodiment of the invention, the scintillating fiber cores 32 are surrounded with an X-ray absorbent cladding 40. Thus, these bundles are preferentially sensitive to incident radiation that is aligned along the length of the fiber. Off-axis radiation will be absorbed by the cladding. Thus by aligning the fibers along the axis of the X-ray beam 20, a self-collimating detector is achieved that is maximally sensitive to the principle beam, and automatically rejects the scatter radiation. Known fiber technology includes both plastic and glass cores and claddings. To confine the light generated by scintillations for X-rays in one core, the refractive indices of the core and cladding material are selected as is known in the art to cause total internal reflection of that light. The claddings not only provide that refraction, but contain one of the X-ray absorbing materials. A suitable material to be put in the cladding that will not scintillate under X-rays, and that will be an absorber could also be a glass forming material such as Lead in the form of PbO. The claddings not only provide the desired refraction, but may include an outer layer containing some mixture of the oxides of Tungsten, Copper and Nickel, and or any other heavy metal that is a good absorber of X-rays. This outer cladding will enhance spatial resolution and reduce cross-talk by absorbing X-rays entering the coherent fiber bundle at other than normal incidence. In addition, these metals all form black oxides, particles which will serve to absorb scintillation photons that are generated at angles too large for total internal reflection, again eliminating cross-talk and enhancing spatial resolution. The scintillating material (nano-particles) in the cores of the coherent bundle may be any one of a number of oxides, chosen for their particular response to X-rays, and their decay times. Some examples, not all-inclusive, are listed as follows:

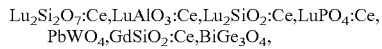

This list is by no means complete, other scintillating nanocrystallites being known to those skilled in the art.

In the conventional detector design, a certain fraction of the light generated by the scintillation events goes undetected as it is not directed towards the photo-detector. This limitation is a significant source of decrease in DQE. In this invention, because of the inherent light-guiding property of the fiber cores 32 and the surrounding cladding 40, and the addition of the light reflecting mirror 34 (that is transparent to X-rays), one can significantly increase the light capture efficiency.

Ideally, the micron or sub-micron spaced light-guiding cores 32 would be made of a highly efficient scintillating material. Efficient scintillating materials are crystalline, and these cannot be readily drawn into fiber to make coherent fiber bundles as described above.

To overcome this, the invention provides for the fabrication of micron or sub-micron sized coherent bundles that contain nanocrystallites of scintillating materials. Patented torch designs, U.S. Pat. Nos. 5,599,511 and 5,447,708, have been developed by which it is possible to synthesize, at relatively high rates, unagglommerated nano-scale oxide particles of nearly arbitrary complexity. This scintillates efficiently in the red over a wide range of X-ray energies, from 10 kev up to 180 kev. It should be noted that the choice of nanocrytallite and the doping material used for unagglommerated suspension in the micro-cores is completely general and may be optimized for the detector application at hand. For example, in computed tomography (CT), where fast refresh rates are required, a scintillator with small lag time and minimal after-glow is preferable. Such particles are known to those skilled in the art.

Figure 9:
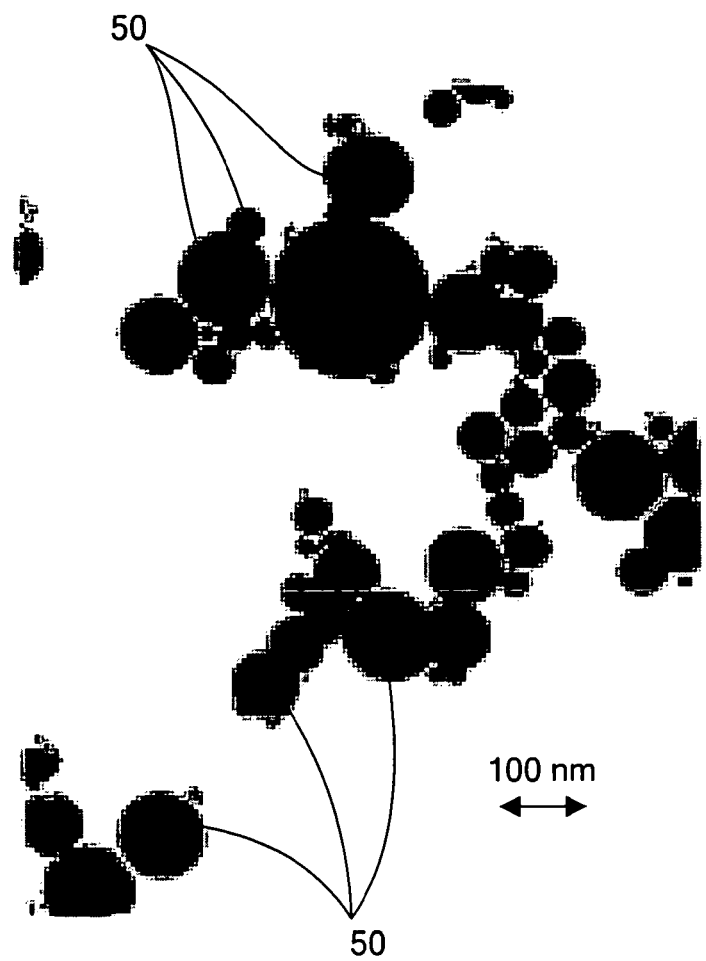
FIG. 9 is a photomicrograph of nanocrystallite particles used in the invention.
Figure 10:
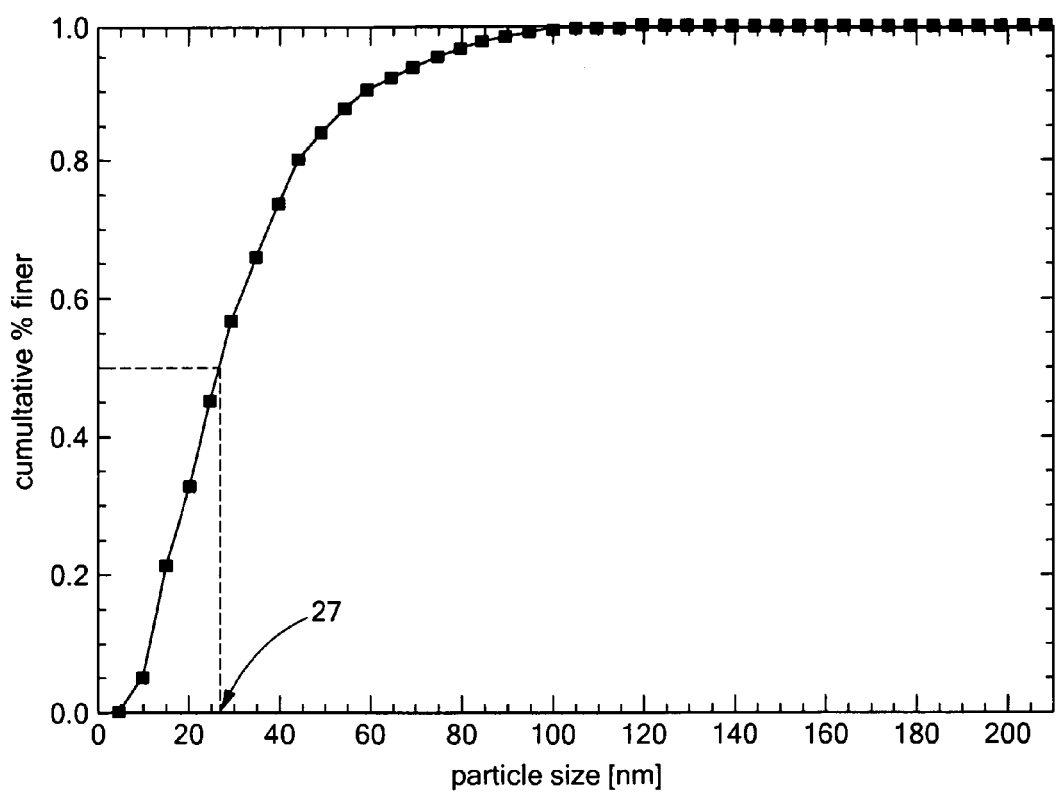
FIG. 10 is a distribution concentration chart of the particles of FIG. 9 as used in the invention.
Figure 11:
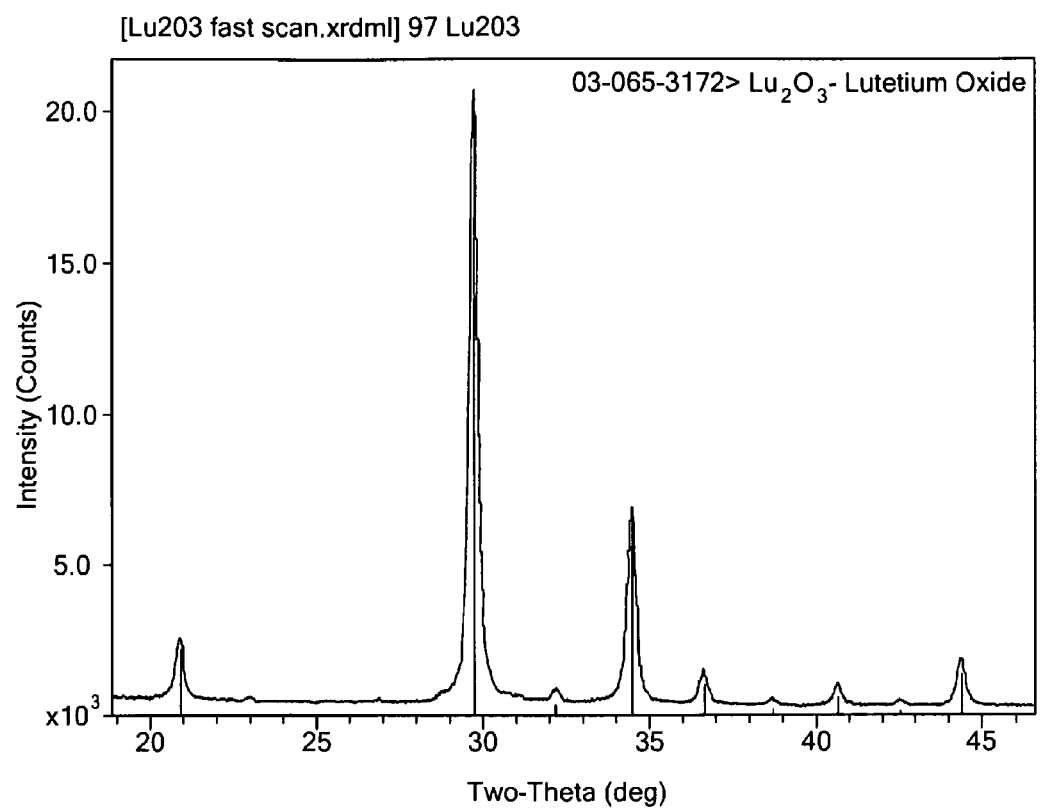
FIG. 11 is a light emission chart of one type of scintillation particles used in the invention.

In FIG. 9 is shown a typical TEM of unagglommerated particles 50 (in this case YAG). The morphology of the particles shows no agglomeration, which is significantly different from the case in which small particles are produced either by spray pyrolysis or sol-gel techniques. This is of significance in embedding the particles in a core that is to be subsequently drawn in bundles to smaller and smaller diameter by repeated drawing. A typical particle size distribution is presented in FIG. 10 showing that almost all particles are significantly smaller than a few 100 nm, and that the average size (in terms of number) is only 27 nm. Of greater significance, however, is the ability to make ultra-pure nanoscale scintillating crystallites. FIG. 11, shows the X-ray spectrum of $Lu_2O_3$:Eu. This material is not only nanoscale, its X-ray spectrum shows perfect agreement with all of the characteristic peaks of lutetia. Because of its cost, materials other than lutetium-based ones are preferred.

Coherent bundles, independent of the material of which they are made, begin with a large transparent core rod of refractive index $n_1$, and a surrounding cladding material with refractive index $n_2$, where $n_1 > n_2$. Thus, TIR (Total Internal Reflection) confines rays within the core if they satisfy the condition that the ray angle perpendicular to the normal of the incident ray is greater than $\sin^{-1}(n_2/n_1)$. The larger the differences in the refractive indices, the greater the guiding characteristics of the core.

An initial preform may be of the order of several centimeters in diameter. This preform, core doped with scintillating particles, is then drawn into "cane". For simplicity, consider a 1 cm preform that is drawn precisely into cane that is 1 mm. Then, 100 of these 1 mm canes can be stacked (10×10) to form again a 1 cm preform. If this is done five times, each time re-bundling 100 canes, then the final size will be 1 μm. The current technology using existing draw towers allows one to obtain cores as small as 100 nano meters. In FIG. 7, there is shown a highly regular array of hexagonal guiding cores 32 surrounded by a lower index plastic.

In order to improve the DQE in a further embodiment, cross-talk between the micron or sub-micron sized guiding cores of the coherent bundle is minimized by making the bundle focused on the X-ray source focal spot, and by rejecting off-axis X-ray photons. For example, these features are accomplished by incorporation of a PMMA cladding containing lutetia nanocrystallites without any europium. This cladding will significantly attenuate the X-rays; however, as noted above, it will not scintillate as it will not be doped with Eu. Thus, the macroscopic coherent bundle will stop off-axis X-rays, and scintillation will be produced and guided only within the micron or nano-sized cores.

In another embodiment the fiber bundles may be produced using the known "Island-in-the-Sea" technology starting with a packet of very fine fiber cores in the center. Such fibers are known in the art of extruded plastic fiber fabrication. By incorporating X-ray absorbing material in the cladding material to be extruded, and by including X-ray scintillating material in the "islands," or core material, a similar result to those presented above could be effected.

Figure 12:
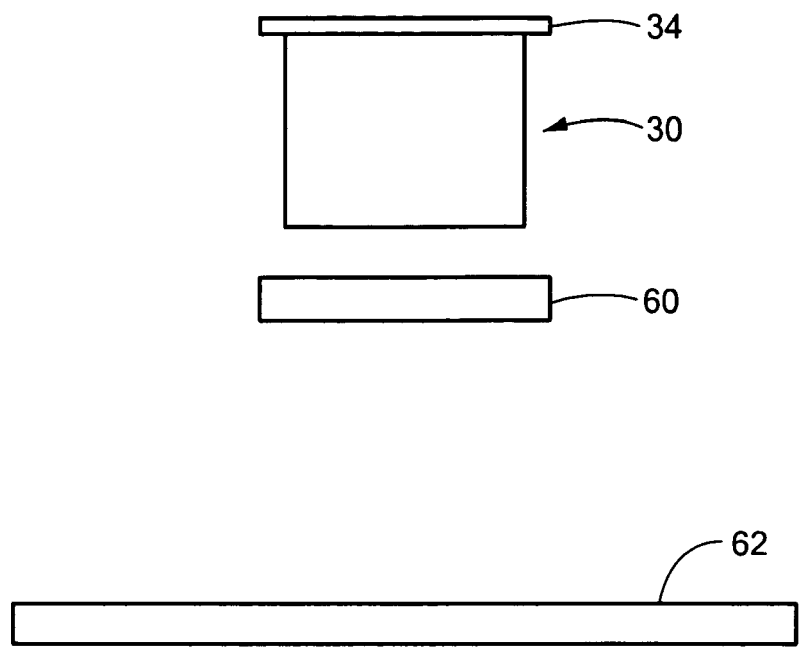
FIG. 12 is a diagram of one embodiment for a detection scheme according to the invention.
Figure 13:
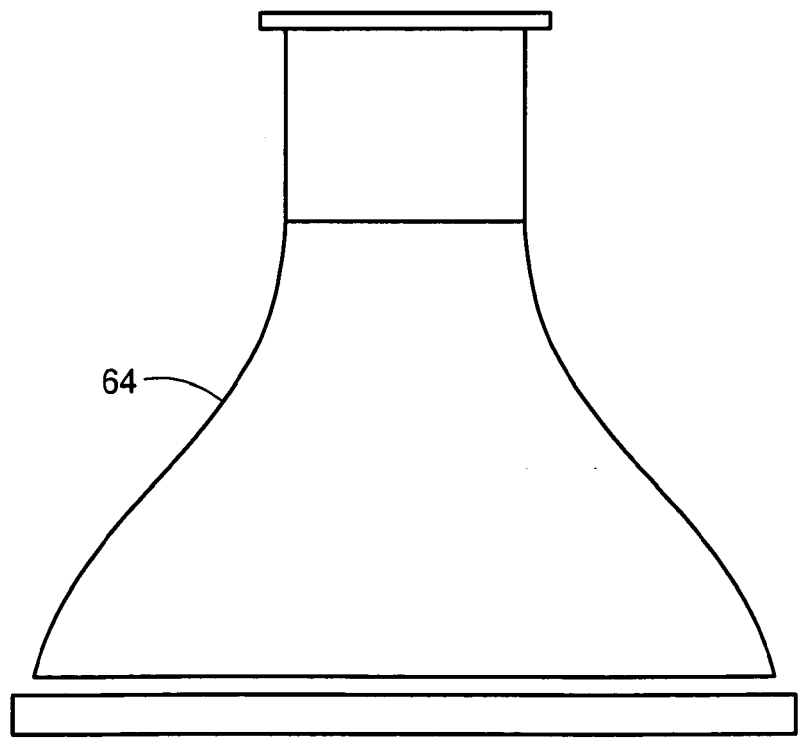
FIG. 13 is a diagram of a further detection scheme.

The photons, once generated, need to be "detected" if an image is to be produced. CCD arrays can be obtained commercially with a 5 μm resolution, which is larger than the micro or nano-sized scintillating cores. Photo-detector arrays using Thin-film Transistors (TFT) are also available. Multiple arrangements are possible to accomplish an interface between the scintillating cores and a CCD or TFT array. A simple way to generate an image would be to expose a high-resolution, single emulsion photo-sensitive film. Such an image, however, will not be digital or continuous "live". An arrangement based on image-intensifiers is also feasible. A direct coupling of an existing CCD or TFT matrix with a bundle of scintillating cores is feasible if one accepts the situation that there will be multiple cores per photo-detector element. At the limit of present technology, where the cores measure in the 100's of nam and the photo-detector measures about 5 μm in size, there will be many nano-cores for each photo-detector. If a one-to-one coupling between the nano-cores and the photo-detectors is desired, a lens 60, as shown in FIG. 12, is provided to expand the image of the output of the bundle 30 of the invention onto a detector 62. In a second embodiment, the image plane at the output of the coherent bundle 30, as illustrated in FIG. 13, is expanded in a coherent bundle 64, such as those available from Schott N A. This can be implemented with a plastic fiber bundle as well as with a "soft glass" fiber bundle. Decreasing core size and core separation while still eliminating "cross-talk" between cores would further increase spatial resolution.

The processing temperatures of these "soft glass" bundles are of the order of 1,200° C. to 1,400° C., and it might be imagined that a refractory oxide would retain its integrity in such a melt. This, however, is not the case. Even if lutetia, with its melting point of 2,450° C., were placed in a melt of a complex oxide glass at even 1,200° C., the lutetia might dissolve. However, it is possible to produce a complex glass/ceramic with phase-separated, nanoscale islands of, for example, lutetia doped with europium among other materials. This is a relatively complex undertaking, however, it is entirely feasible using known processing technologies. Further for those high temperature oxides that do not "dissolve" in the complex "soft glass" melt, it is possible to include scintillating nanocrystallites in the core melt in the same manner as described above for plastic cores. Such "soft glass" is available for example from Schott N A.

Thus, for simplicity, the preferred embodiment includes producing a coherent bundle of scintillating fibers using relatively simple plastics that can be processed with ease, although the same techniques are applicable to a complex glass melt. With regard to plastics, in particular, light transmitting coherent bundles of PMMA and Polystyrene are one embodiment. In FIG. 7 is shown a microscopic picture of an array of hexagonal guiding structures, with the hexagons having a dimension of 5 μm. The regularity of this structure is impressive.

In one embodiment scintillating micro- or nano-cores using $Lu_2O_3$:Eu are used. In addition to its scintillation characteristics, it is noteworthy that lutetia is extremely efficient in stopping X-rays. The central portion of each core utilizes the scintillation property of Eu doped lutetia. Eu doping provides a significant number of visible (red) photons that are near the peak of sensitivity of traditional photodetectors. The cladding surrounding the core, contains lutetia nanocrystallites which are devoid of Eu doping, and this provides for self-collimation and scatter rejection by virtue of the superior stopping power of lutetia.

Over the past decades, there have been significant developments in the synthesis of scintillating crystalline materials. The preferred materials of the invention are specifically applicable to oxides, of which there are a great many. Some examples are as follows:

$Lu_2Si_2O_7$:Ce,$LuAlO_3$:Ce,$Lu_2SiO_2$:Ce, $LuPO_4$:Ce,$PbWO_4$,$GdSiO_2$:Ce,$BiGe_3O_4$

Gadolinium Oxysulfide ($Gd_2O_2S$), though it is not a pure oxide, can also be engineered for unagglommerated suspension in micro- or nano-cores made of plastic. Different oxides have different characteristics with regard to visible photon production efficiency, and decay rates. It is also possible to mix in "impurities" with light quenching properties to accelerate the decay time of the light produced by scintillation events. This is particularly important in CT scanners where thousands of projections per second are acquired by fast rotating gantries.

If the doped plastic rods are too thick or too heavily doped, X-rays will be stopped, but the scintillation will not be optimum. Also, much of the light generated by the scintillation event may be lost by internal absorption. On the other hand, if they are too thin or too lightly doped, then there will be insufficient absorption of the X-rays as well as too few scintillating photons. In the current invention, the doping density can be varied to optimize the light generation and capture property of the micro- or nano-core. For a given doping density, the length of the scintillating core can be varied to match the desired stopping power. By optimizing the doping density and length of the scintillating cores such that all the X-rays are stopped, an optimal X-ray conversion and light generation/capture efficiency simultaneously can be achieved.

The synthesis of unagglommerated nanocrystallites uses a combustion environment in which temperature gradients are minimized. This is a consequence of the fact that although particle growth occurs everywhere during a homogeneous gas phase reaction, particle agglomeration occurs primarily on the air-flame interface where temperature gradients are the largest. For this purpose the reaction zone is circumscribed by two high volume oxy/hydrogen ribbon burners and confining silica plates. Thus, the boundary conditions are provided by the heated silica plates, with temperatures in excess of 1,200° C. When ultra-fine particles are produced, thermophoresis tends to drive them across streamlines to the colder surface. By placing a small angle on the plates, there is a boundary layer growth that overcomes the thermophoretic driving force, and thus, it is possible to generate particles in the combustion region without having them deposit on the plates. For low cost generation of the material, lutetium oxide particles, obtained for as little as 75 cents/gm are converted into a nitrate. These soluble nitrates are then injected into the ultra-high temperature reaction zone using a (Sono-Tek) nebulizer as the particle injection source. The nitrates are extremely soluble in water, so reasonable through-put for nanocrystallite synthesis is obtained. This allows the conversion of agglomerated oxide particles into nanoscale unagglomerated oxide particles. As a consequence of the absence of sharp temperature gradients, when compared with traditional spray pyrolysis, and the fact that the particles are rapidly quenched, it is possible to obtain particle morphology characterized in FIG. 9.

The nanocrystallites of $Lu_2O_3$:Eu are mixed in polystyrene for the core material, and $Lu_2O_3$ (without the Eu) is mixed into PMMA for the cladding material. Claddings are fabricated by casting MMA monomer in glass tubes with removable Teflon centers. The cladding can be cast in different shapes and sizes using this method. Different fiber profiles include: hexagonal outer diameter (OD) with a round inner diameter (ID); hexagonal OD with a hexagonal ID; and round OD with a round ID.

The casting process begins by first carefully distilling and filtering a MMA monomer. The purified monomer is then bubbled with nitrogen to remove any dissolved oxygen and placed in the glass tube with the removable Teflon rod. The assembly is placed in an oil bath which is heated using a programmable controller. Once the monomer has polymerized, the PMMA is removed from the glass tube and the Teflon rod is also removed. The polymerized tube is placed in a vacuum oven for a few days to relax and de-gas.

A core material of natural polystyrene (PS), which is fabricated in a similar manner to the PMMA tubes, is placed inside the cladding and the assembly is fused under vacuum. This preform is then be drawn into a fiber with a diameter of 1-3 mm using a fiber optic draw tower. The drawn fibers can be cut, re-stacked, and redrawn repeatedly to further decrease the size of the cores.

An alternate technique for the fabrication of guiding cores surrounded by a lower index material is the extrusion process commonly used in plastic fibers that results in "islands-in-the-sea" technique, in which a high index plastic is used for the feed in the central region that produces many individual guiding cores. Another plastic in the extruder is of lower refractive index, and this provides for the surrounding material of the multiple guiding cores. This is a known art, and the results can be similar to those described above. The plastic extrusion of the inner core material would have its feed contain some volume percentage of scintillating nanocrystallites, and the surrounding core material would contain nanocrystallites that would absorb X-rays and provide the desired high DQE.

The invention above is presented in preferred embodiments, the actual scope of the invention is to be limited only according to the following claims.

The invention claimed is:

1. An assembly for converting X-rays to detectable light comprising:
    a fiber optic bundle including:
        a plurality of fiber cores of unagglomerated, nanocrystallite scintillation particles suspended in a plastic body, said scintillation particles providing scintillation in response to incident X-rays; and
        at least one cladding of a non-scintillating material surrounding each of said plurality of fiber cores,
    wherein said plurality of fiber cores and the respective cladding collectively form the fiber optic bundle, the fiber optic bundle operative to direct light from X-ray scintillation along the plurality of fiber cores.

2. The assembly according to claim 1 wherein the cladding is comprised of a material absorptive to X-rays.

3. The assembly of claim 1 wherein said plurality of fiber core are of a material of a first refraction index and the cladding is of a second refraction index.

4. The assembly of claim 3 wherein said first and second refraction indices are selected to confine light from X-ray scintillation to a fiber core in which it originates.

5. The assembly of claim 1 further including:
    a multi-sensor detector assembly; and
    an imager for imaging light from X-ray scintillation from said fiber optic bundle onto said multi-sensor detector.

6. The assembly of 5 wherein said imager includes a lens.

7. The assembly of claim 5 wherein said plurality of fiber cores have corresponding diameters, and wherein said fiber optic bundle has a core spacing defined by the diameters corresponding to the respective fiber cores.

8. The assembly of claim 1 wherein said fiber optic bundle has a core spacing in the range of 0.1 to 25 microns.

9. The assembly of claim 1 wherein said fiber optic bundle comprises one or more sets of fiber optic bundles formed in one or more bundle drawings.

10. The assembly of claim 1 wherein each of said plurality of fiber cores and the respective cladding is of a cross-sectional shape selected from the group consisting of circular, hexangular, and square.

11. The assembly of claim 1 wherein each of said plurality of fiber cores has a corresponding diameter greater than or equal to 100 nanometers.

12. The assembly of claim 1 further including a cover disposed over said fiber optic bundle that is reflective to light and transmissive to X-rays.

13. An X-ray imaging system, comprising:
    an X-ray source;
    an object position for subjects to be analyzed by X-ray exposure;
    an assembly according to claim 1 positioned to respond to X-rays passing through one of said subjects at said object position to provide light as an output from said fiber optic bundle; and
    a light detector for sensing said output and providing an image signal in response thereto.

14. The imaging system of claim 13 further including an imager for providing a visible image in response to said image signal from said light detector.

15. A method of forming the fiber optic bundle of claim 1 comprising the steps of:
    drawing two or more sets of fiber optic bundles;
    stacking sets of drawn fibers together after drawing each of said two or more sets of fiber optic bundles; and
    drawing the stacked sets.

16. The assembly of claim 1 wherein said unagglomerated scintillation particles are comprised of a compound selected from the group consisting of: $Lu_2Si_2O_2$:Ce, $LuAlO_3$:Ce, $Lu_2SiO_2$:Ce, $LuPO_4$:Ce, $PbWO_4$, $GdSiO_2$:Ce, and $BiGe_3O_4$ and their plastic scintillating analogues.

17. The assembly of claim 1, wherein the at least one cladding comprises an optically absorbent layer for absorbing scintillation photons impinging the cladding at angles too large for total internal reflection.

* * * * *